Jan. 29, 1935.  S. L. KERR  1,989,481
CONTROL SYSTEM AND APPARATUS FOR POWER GENERATING EQUIPMENT
Filed Sept. 5, 1931    3 Sheets-Sheet 3
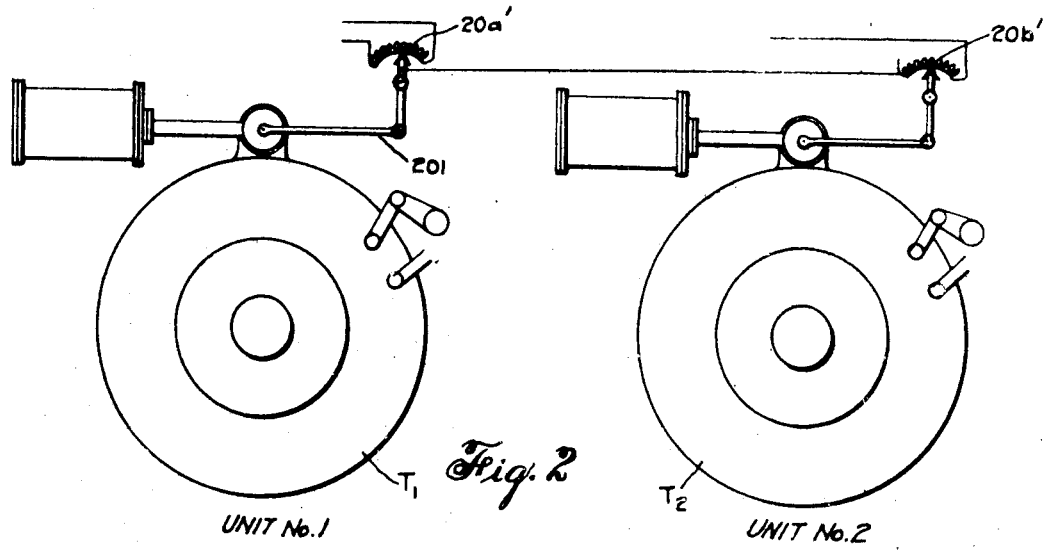
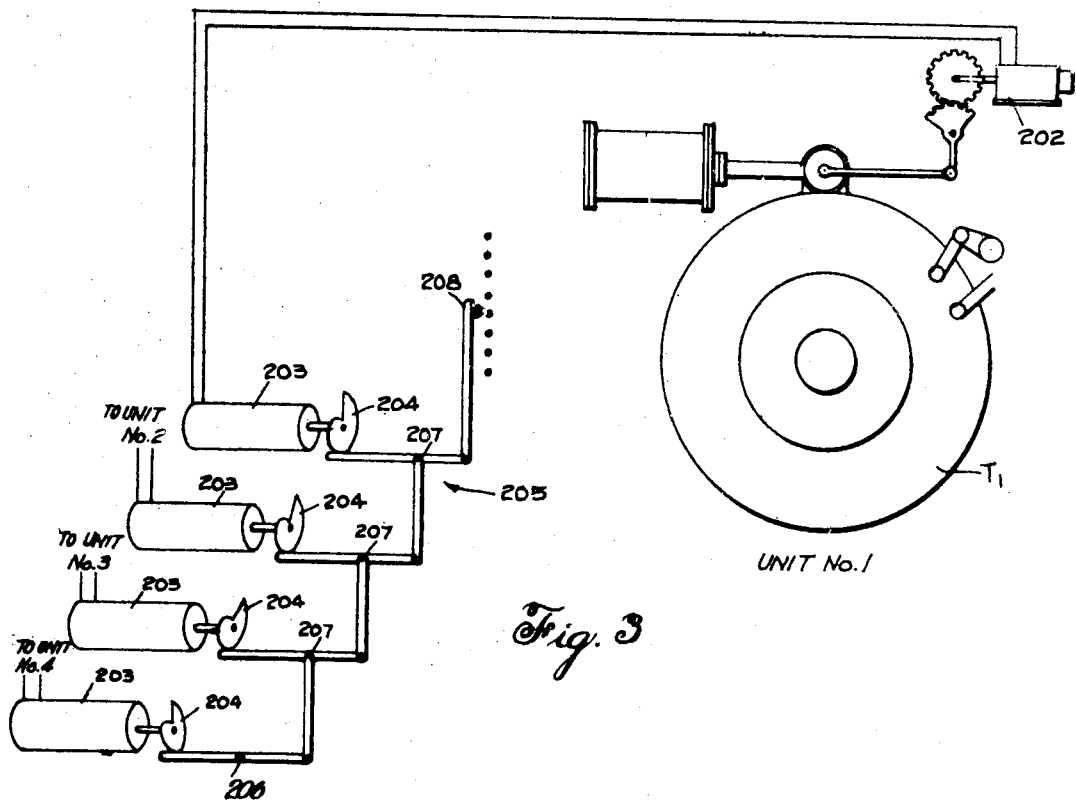
INVENTOR
S. Logan Kerr
BY
Edward L. Hathaway
ATTORNEY Patented Jan. 29, 1935

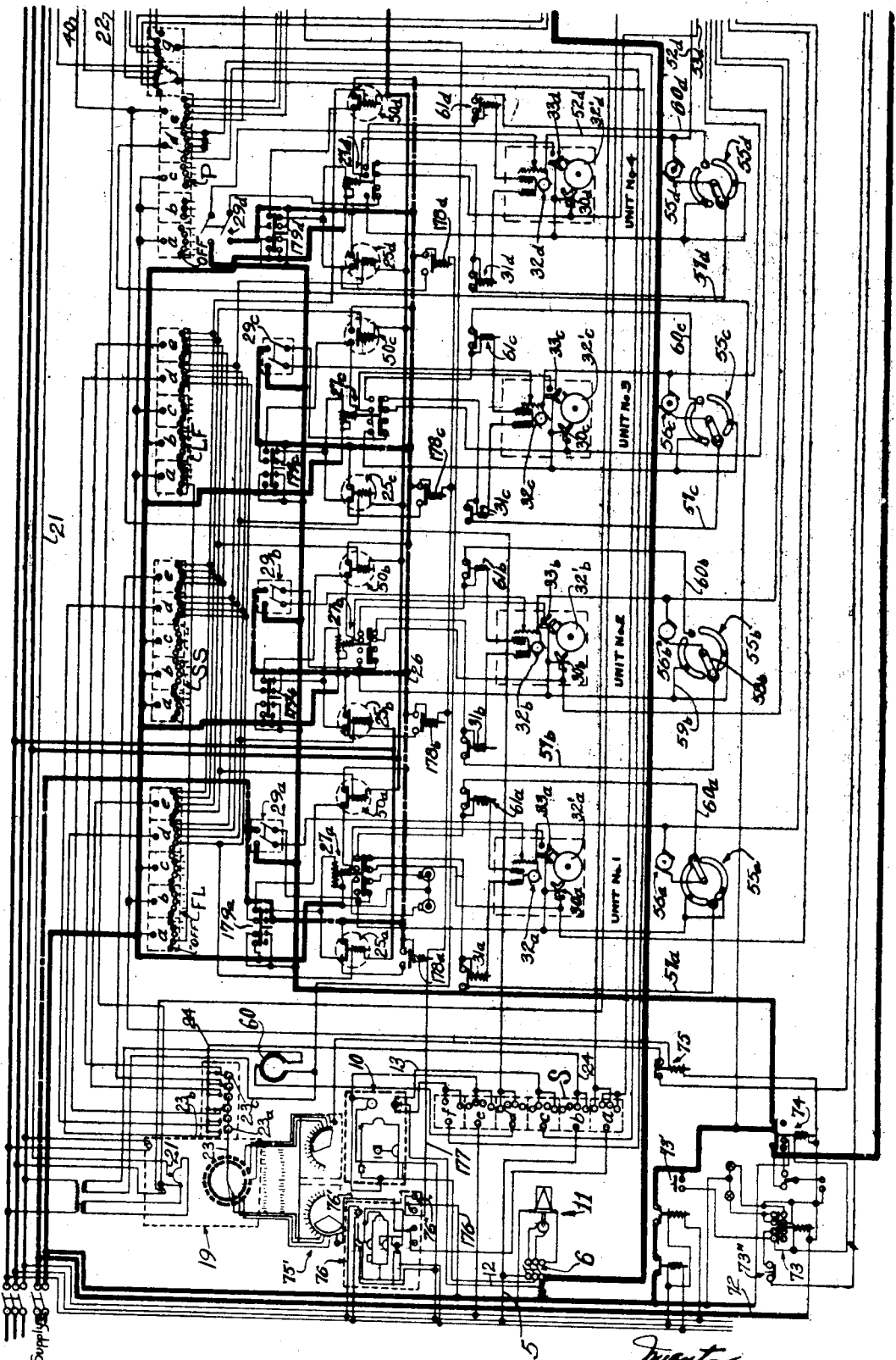

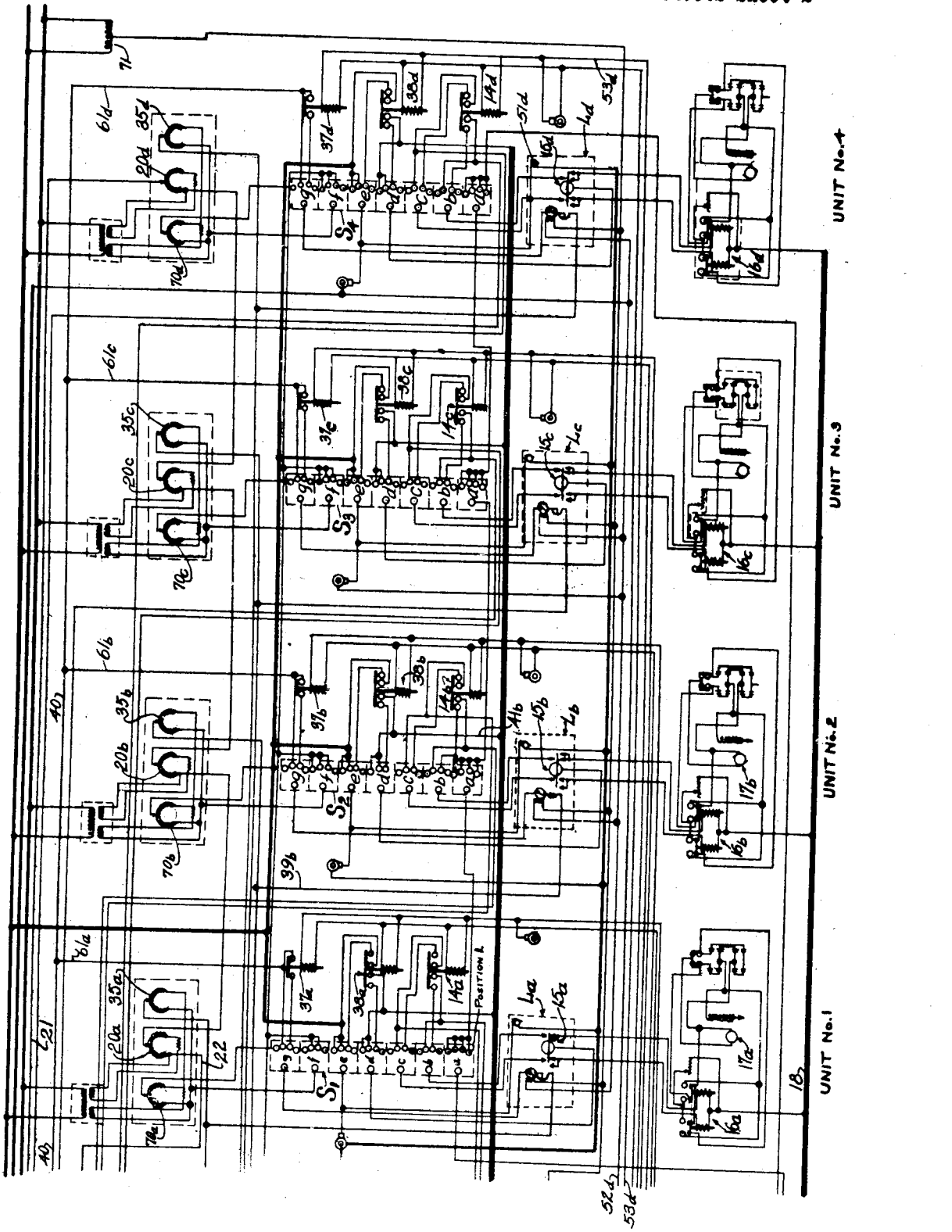

1,989,481

UNITED STATES PATENT OFFICE 1,989,481

CONTROL SYSTEM AND APPARATUS FOR POWER GENERATING EQUIPMENT

Samuel Logan Kerr, Philadelphia, Pa.

Application September 5, 1931, Serial No. 561,461

30 Claims. (Cl. 290—4)

This invention relates generally to an improved method and apparatus for controlling and operating a plurality of prime mover operated electrical generating units especially of the hydro-electric type and more particularly for controlling the units, in the most economic manner, in accordance with frequency and load conditions.

In the various interconnected electric generating systems or on generating systems operating independently of other major systems, the requirement for automatic frequency control is of great importance due to the necessity of stabilizing the frequency for maintaining interconnections and for eliminating unnecessary governor movements on other generating units which are not adapted to frequency regulation due to the characteristic of the units or due to the requirement of economy at those particular plants. One station is usually employed to control the frequency for the whole system or systems while the remaining stations on the system are subject to load control. The frequency controlling station must have sufficient capacity available at all times to take care of increases in demand on the system whether of a normal nature or of an emergency nature. This surplus capacity is commonly called system reserve capacity and has usually been secured by operating a surplus number of units in parallel with the system with the result that the overall efficiency of the generating station has been materially reduced over that possible if this reserve capacity was not required. For example, in a station having four units of 15,000 kilowatts capacity each, corresponding to a total station output of 60,000 kilowatts, if the requirement for the average demand on the plant is only 25,000 kilowatts, it would be desirable to run only two units, leaving a total margin of 5,000 kilowatts in excess of the demand. This would normally be the most efficient form of operation. However, if additional reserve capacity was required calling for the operation of three units with a total reserve of 20,000 kilowatts and a normal output of only 25,000 kilowatts, each of the three units, which are assumed to be identical in design, would be operating at partial load and at a correspondingly lower efficiency, thus introducing an excessive loss in the actual functioning of the plant.

In order to avoid this loss and improve operating conditions, it is desirable to run the surplus units as synchronous condensers motored from the line as the overall efficiency can be materially increased in this manner. The difficulties attendant to this type of operation are that in order to avoid passing the economic limits of operation the operating staff must be on the alert at all times to transfer at the proper load values surplus units to condenser operation as the load demand decreases or to bring them on to load from condenser operation with an increase in demand. In an emergency these reserve units would have to be manually released in order to be able to pick up load without requiring an excessive speed drop on the system.

The automatic control equipment described herein provides for the accomplishment of these various operating functions by means of automatic equipment in such a manner that with any given number of units in service and with any given load on the station, this load would be carried on the economic number or combination of units, leaving the surplus units as synchronous condensers, which however would be available at some predetermined rate if the load demand increased and would be instantly available in case of an emergency on the system calling for additional capacity as a result of a drop in frequency below some predetermined value. The automatic control equipment herein also provides for the transferring of units from load to condenser as the demand decreases, thus securing the maximum overall economy possible for the given operating conditions imposed upon the station.

With plants operating under relatively constant head, it is possible to outline a program of operation which calls for the transfer of units between load and condenser operation in accordance with the economic requirements as indicated under unit characteristics which with respect to each other may be similar or dissimilar. Having this information available, it is then possible as outlined in my co-pending application, Serial No. 525,355, to establish points of transfer from condenser to load as the demand increases from that required on one unit to that which would require two units and also transferring additional units from condenser to load as the demand further increased, each of these transfer points being determined from the characteristic curves and established as some total output of the station to give substantially maximum economic operation. The same method is employed for determining the points at which the unit should be transferred from load to condenser service as the demand on the station decreased, this also being established as some total output of the unit in service. With the automatic transfer equipment as described in my co-pending application, Serial No. 525,355 and application Serial No. 561,460 filed herewith, I have described arrangements whereby the transfer of units from load to condenser or vice versa can be accomplished. In the disclosure herein the means to actuate this transfer equipment is based upon the totalized output of the station as determined by a totalizing wattmeter reading the sum of the output of the respective units in service. My previous applications have dealt with emergency transfer conditions as a result of low frequency following system faults or by the unit output as determined by suitable means such as the position of the gate operating mechanism on the respective units, the transfer points being established by the study of the unit characteristics with respect to gate opening in order to determine the economic transfer points.

The disclosure herein further relates to the use of the total station output or of the output of certain predetermined units to effect the transfer between load and condenser at the economic points. It is desirable to establish some spread between the points of transfer from load to condenser and from condenser to load to reduce the number of transfer operations in case the demand should be at or near the transfer points. Thus it may be desirable to transfer the unit from condenser to load at a station output of 14,000 kilowatts or to transfer the unit from load to condenser at a station output of 12,000 or 13,000 kilowatts. The establishment of these limits is dependent in all cases upon the local conditions existing at the plant and the design of the units as well as the variations of demand on the particular system. These transfer points are made adjustable herein and can be adapted to the particular requirements at any given location.

The utilization of this automatic control equipment materially improves the operating economy of a prime mover operated generating station, particularly a hydro-electric generating plant, through increased efficiency at any given point where a surplus number of units are required and also due to the maintaining of automatic load distribution between the various units operating on load to secure the best economy from them. It also practically eliminates the inherent objections to the manual operation whereby surplus units are operated on load at very inefficient points with resultant loss and the periods during which an insufficient number of units were operated, resulting in excessive overload on the various units affecting not only the economy but the tendency toward erosion or damage to the machines themselves.

It is one of the objects of my invention to accomplish these functions herein automatically instead of relying upon the operating personnel to follow the ideal loading and operating schedules.

Other objects and advantages will be clear to persons skilled in the art from the following description of the accompanying drawings in which:

Figs. 1 and 1a are wiring diagrams of the invention.

Fig. 2 is a modification showing resistances mechanically actuated by the gate operating mechanism;

Fig. 3 is a further modification showing the use of Selsyn transmitters and receivers controlled directly in accordance with the gate opening.

While the various types of operation have been given type numbers, this is merely for convenience of description and is not intended to limit the invention merely to those particular types of operation as it will be clear to those skilled in the art that various other operations are possible depending upon the manipulation of the switches and controls.

*Type 1 operation: station frequency control with any one unit acting as a pilot unit and with the remaining units transferred in any given order from load to condenser or vice versa in accordance with a predetermined schedule of operation for maximum economic load distribution.*

In my co-pending application, Serial No. 408,544 and application Serial No. 561,460 filed herewith, I have described an arrangement whereby with two or more units connected in parallel to a system, one unit is controlled by a frequency controller so that upon occurrence of frequency variations in the system the output of this unit will be raised or lowered as is necessary to maintain normal frequency and during this raising or lowering, the output of the remaining units is raised or lowered so as to follow the first unit in a predetermined manner. This operation further involves an arrangement for equalizing or maintaining equalized the output between all units thereby insuring maximum economic distribution of load, assuming of course that they have identical characteristics although if they have dissimilar characteristics the load is distributed in accordance with a predetermined schedule of operation as outlined in my co-pending applications.

In my co-pending application, Serial No. 525,355, I have also described how with two units, one of which is on load and the other on condenser, the condenser unit may be automatically transferred to load if, in case of increased demand, it is more economical to operate the two units for a given load than to maintain just the one unit on load, while in case of decreased demand one unit is transferred from load to condenser when it is more economical to operate the first unit alone. In said application the station output would be economically divided between the two units when both were on load. This automatic transfer was effected specifically by means of switches actuated by a cam directly connected to and movable with the gate operating piston and cylinder motor, the position of say a piston rod of the motor giving an indication of the output of the unit and the point at which the unit should be brought from condenser to load or vice versa.

In the present type of operation now being considered the automatic transfer from condenser to load or vice versa is effected in accordance with the total output of the station in that in the specific illustration of the invention herein a totalizing wattmeter is employed and the arrangement is such that four units are subject to the automatic control although more or less may be used.

*Unit No. 1 as pilot unit and units 2, 3 and 4 successively transferred from condenser to load in order named and from load to condenser in reverse order.*—In this operation a master or type selector switch S is set in position 1. Position 1 is the lowermost contact in the arcuate group of contacts in each section $a$ to $f$, position 2 being the next contact, etc. Sub-type selector switches (Fig. 1a) $S_1$—$S_4$, sometimes referred to as unit selector switches, are each in position 1. Position 1 is the second contact from the bottom of the arcuate group in each section a to g, position 2 the third contact, etc., while the first contact is an "off" position. A sequence selector switch, Fig. 1, FL is in position 2. Position 2 here is the third contact from the left in each group of arcuate contacts, position 3 being the next or fourth contact to the right while the first contact is the "off" position. Sequence selector switches SS and LF are in positions 3 and 4 respectively, the location of the positions being the same as with switch FL. To facilitate understanding of the operation of the sequence selector switches the number of the switch position corresponds to the unit of the same number and the letters FL mean that whichever unit is selected by this switch that unit will be first (F) to come on load and last (L) to go on condenser from load, or "first on" and "last off". For example if this selector switch is in position 2 that means that when the load has increased to a point where an additional unit is required unit No. 2 will be the first unit to be transferred from condenser to load so as to add its output to that of unit No. 1 already in operation. Similarly if units 2 and 3 and possibly 4 are on load and each of which are to be successively transferred back to condenser as conditions may require, unit No. 2 will be the last one (L) to be so transferred. In other words the first letter for all of these switches stands for the order in which the selected unit comes "on" and the second letter for the order in which the selected unit goes "off". If sequence selector switch FL is in position 3 then unit No. 3 (the number of the unit and position number corresponding) will be the "first on" and "last off" and the same is also true for position 4 and unit No. 4 if they should be selected for this particular sequence.

Continuing with the assumption that unit No. 2 is to be the "first on" and "last off" and assuming that it is desired to have unit No. 3 to be "second on" and "second off," sequence selector switch SS will be placed in position 3, the position number again indicating the unit. The first S of SS stands for "second on" while the second S is for "second off".

With units Nos. 2 and 3 taken care of and assuming it is desired to have unit No. 4 to be the "last on" and "first off" then unit selector switch LF is placed in position 4, thereby causing unit No. 4 (corresponding to position 4) to be the last unit transferred from condenser to load and the first unit to be transferred from load back to condenser. L is for "last on" and F for "first off".

A pilot selector switch P is in position 1 corresponding to unit No. 1, the other position numbers corresponding to units with similar numbers. Whichever unit is here selected will act as a so-called pilot unit meaning that this unit will always be on load and will not at any time be transferred to condenser and also meaning that after a frequency corrective impulse has been transmitted to all units on load, including the pilot unit, the output of the pilot unit remains constant to permit the output of the other remaining units to be adjusted toward that of the pilot unit. The frequency corrective impulses and subsequent load adjustment between units is continued until normal frequency and equal division of load is obtained between all units. Or in another aspect it is seen that the pilot unit is responsive only to frequency impulses while the remaining units are responsive to both frequency and load distributing impulses.

The pilot switch functions to cut out the galvanometer circuit of the load controller of any particular unit which it is desired shall receive the frequency control impulses during any frequency control operation. During all other operations the pilot switch is in off position, thus allowing the load controller of each unit to be operative if desired.

In this description the suffix letters $a$—$c$ indicate the instruments and wires for the respective units 1—4. While there are certain other uses of suffix letters $a$, etc., having no reference to the units, such uses are easily distinguished from the others.

Assuming unit 1 to be on load and the other units on condenser and the various switches set as indicated then upon occurrence of a drop in frequency from normal the frequency controller 10, Fig. 1, will operate through its contact-making device to transmit frequency corrective impulses to increase the output of unit No. 1. This frequency controller is preferably of the same general type disclosed in my co-pending application, Serial No. 408,544, and hence its details of structure and operation need not be specifically described. It will suffice to state here that a circuit is established from one side of the D. C. supply (upper left corner Fig. 1) through a wire 5, across an interrupter mechanism generally indicated at 11 and described in said co-pending application and thence across a switch 6 to a neutral wire 12 intermittently closed to a wire 13. This wire 13 is connected through switch $S_c$ in position 1 to pilot switch $P_f$ in position 1, across left pair of contacts of relay $14a$, switch $S_1b$ in position 1, special contacts of the contact-making device $15a$ of the load controller generally indicated at $La$, thence to the raising (right) coil of a relay control $16a$ for controlling the load adjusting or synchronizing motor $17a$ of the speed responsive governor normally used for controlling the prime mover, the current from the relay returning through wire 18 which is connected through protective circuit relays (lower left corner Fig. 1) to the other side of the D. C. supply. Actuation of the motor $17a$ will cause the governor to increase the output of unit 1, thereby tending to restore normal frequency although if the frequency continues to vary from normal, controller 10 will continue to transmit corrective impulses to unit 1 until normal frequency is established.

Assuming that the output of unit 1 has been increased to such a point that in order to maintain normal frequency it is now more economical to transfer unit No. 2 from condenser to load and divide the combined output between the two units. Mechanism for accomplishing this automatically includes (upper left corner Fig. 1) any suitable type of totalizing wattmeter generally indicated at 19 wherein preferably a galvanometer is employed to control the degree of rotation of an indicating shaft in accordance with the total station output. To totalize the output from the units there is provided as described in said co-pending application variable resistances $20a$—$20d$ each driven by the unit wattmeter of their respective units or by any other suitable means such as a direct connection to a gate for indicating the unit output. These resistances are in a series circuit which is connected at all times to the galvanometer and its bridge of the totalizing wattmeter. This circuit starts with a wire 21 at the totalizing wattmeter and is connected to resistance 20d which in turn is connected in series to the other resistances, the first one of which, namely 2d, is connected by wire 22 to the other side of the totalizing wattmeter 19. Now with units 2, 3 and 4 on condenser and their output accordingly being zero, only the output of unit 1 will be registered by the totalizing wattmeter. As its load increases the indicating shaft 23 will be additionally angularly displaced until an output is reached where it is more economical to transfer the second unit from condenser to load than it is to continue increasing the output of unit No. 1, the proper point of transfer being controlled by a circuit which is established from a common supply wire 24 (connected across type selector switch $S_b$ in position 1 to one phase of the A. C. supply) upon closure of a cam 23a with a wire 23b that is connected across sequence selector switch $FL_d$ in position 2 and thence down to time delay relay 25b and to the other phase of the A. C. supply. Upon expiration of the time interval for which this relay is set, its contacts close to establish a circuit from the minus D. C. wire 26 disposed immediately below this relay, across the contacts, thence to the unlatching coil of a latching and unlatching relay 27b and thence to the other side of the D. C. supply as indicated. The relay 27b is described more in detail in my co-pending application Serial No. 561,460 filed herewith and hence a detailed description is not necessary here except to state that a so-called latching coil is provided which when energized will raise a contact bar to close upper contacts and mechanically latch it in its raised position whereas upon energization of the unlatching coil the mechanical latch is released and the contact bar drops to close a set of lower contacts. With the unlatching coil energized and the contact bar of relay 27b in its down position a circuit is established from the minus D. C. side adjacent the right contact of time delay relay 25b, thence up and over to the right upper contact of closed switch 29b, thence down to one side of a snap throw switch 30b in closed position and thence upwardly across the lower right pair of contacts of latching relay 27b, thence downwardly from the outer lower right contact thereof to energize a relay 31b to the left or opening field of a motor 32b and thence through the manually adjustable resistance adjacent the motor then up to and across the left contacts of switch 29b to the other side of the D. C. supply.

Upon operation of the load limit motor 32b, a load limit cam 32b' described in my co-pending application filed herewith is rotated counterclockwise, whereupon, as diagrammatically shown, a finger on the cam ultimately strikes one of the forked fingers of snap switch 30b to open the same and upon opening of this switch the motor circuit is broken. During initial counter-clockwise movement of the cam a second snap switch 33b is closed whereby upon raising of the latching relay 27b a circuit may be established to cause the closing field to be energized as described in a later operation. With the cam now rotated to its counter-clockwise position the turbine gate or other power medium control mechanism, depending upon the type of prime mover employed, will open to allow power input to the prime mover. Also as described in my co-pending application Serial No. 561,460 filed herewith the speed responsive governor will now function in its normal manner.

Economic load distribution between units 1 and 2 is effected by rendering a load controller $Lb$ operative, Fig. 1a. This is accomplished in that when the load limit cam opens snap switch 30b it breaks an otherwise closed circuit extending from the right contact (minus D. C.) of switch 29b down across snap switch 30b, thence over, down and across to Fig. 1a to supply one side of relays 37b, 38b and 14b, the other sides of which are connected through the resistance adjacent the motor 32b and thence to the left contact (plus D. C.) of switch 29b.

This circuit by being broken upon opening of snap switch 30b deenergizes the galvanometer circuit relay 37b, allowing it to close whereupon a galvanometer bridge circuit is established for the galvanometer of the load controller $Lb$. This galvanometer bridge circuit extends from the slide contact of the unit wattmeter resistance 35b, down and along wire 39b, through the galvanometer, thence across sub-type switch $S_{2g}$ in position 1, across the closed contacts of relay 37b, thence along wire 40 to pilot switch $P_e$ in position 1 (upper right corner Fig. 1) and thence over to slide contact of the unit wattmeter operated resistance 35a of unit 1. The galvanometer circuit from load controller $La$ is shunted out due to a closed circuit extending from the right contact of relay 37a, thence up to wire 40 to pilot switch $P_e$ in position 1, thence down through the galvanometer and up to the sub-type switch $S_{1g}$ in position 1 and back to the relay 37a. The load controller $La$ is thus rendered inoperative.

With only load controller $Lb$ operating and with a very material potential difference between the slide contacts of resistances 35a and 35b, upon opening of the gates of unit 2 load controller $Lb$ will transmit load corrective impulses to the right (raising) relay of the set of relays 16b thereby increasing or raising the load on unit No. 2 until no potential difference exists between the slide contacts of resistances 35a and 35b. The circuit for the load control impulses extend from one side of the D. C. supply (heavy line below switch $S_2$) thence upwardly along 41b, across the left pair of contacts of relay 38b, sub-type switch $S_{2d}$ in position 1 to the common of the contact-making device 15b of the load controller $Lb$ and thence through the normal intermittently closed contacts of the load controller such as described in my co-pending application, Serial No. 408,544, to the right one of relays 16b. Lowering load impulses are transmitted in a similar manner through the left set of regular contacts of the load controller to the left (lowering) one of relays 16b. Eenergization of these relays actuates the load adjusting or synchronizing motor 17b to either raise or lower the output of the unit until the output of unit 2 equals that of unit 1. This equalization obtains when no potential difference exists between the slide contacts of resistances 35a and 35b. If the frequency varies, during the redistribution of load between units 1 and 2, it will simply mean that frequency control impulses are transmitted to unit No. 1 so as to vary its output in order to maintain normal frequency, said variation in output being accomplished independently of the action of unit 2 and without any frequency control impulses being transmitted thereto.

Transfer of unit No. 3 from condenser to load is accomplished when the combined output of units 1 and 2 has been increased to such a point that in order to maintain normal frequency it is then more economical to operate three units at possibly a lower output per unit than it is to operate units 1 and 2 at a greater output per unit. Here again unit 3 is transferred by the totalizing wattmeter 19. As the shaft 23 is further rotated due to the increasing combined output of units 1 and 2 it finally causes the second cam (the first cam being 23a) to close its contact whereupon a circuit is established from A. C. supply wire 24, thence across the contacts of the second cam and over to and across sequence selector switch SS$_d$ in position 3 (for unit 3) thence down to the coil of time delay relay 25c and to the other side of the A. C. supply as indicated. If the frequency variation is of sufficient duration, time delay relay 25c will ultimately close thereby establishing a circuit from the D. C. supply line 26 (just below relay 25c) thence across the relay contacts and up and to the right to unlatching coil of a latching relay 27c of the same type as relay 27b, the circuit being completed to the other side of the D. C. supply as indicated in heavy lines. Upon energization of unlatching coil the contact bar drops to cause opening operation of the motor 32c thereby opening snap switch 30c and closing the other snap switch 33c. In the manner similar to that described for the relay controls when unit 2 was transferred to load the relays of unit 3 are similarly actuated, namely 37c, 38c and 14c, whereby load control impulses will now be transmitted to the load adjusting relays 16c in the same manner as described with unit 2. The galvanometer circuit for unit 3 is similar to that for unit 2 while the load distribution is now effected by having the galvanometer for unit 3 bridged against resistances 35c, 35b and 35a. Here again any variations in frequency will cause frequency control or corrective impulses to be transmitted only to pilot unit No. 1 and the other two units will follow up so as to economically divide the load between all three units.

Transfer of unit No. 4 from condenser to load is similarly effected when the station output can be more efficiently carried by four units rather than three. This transfer is effected by the wattmeter control 19 which again registers the combined output of the three units and when the predetermined output is reached at which transfer should take place for maximum efficiency the third cam on wattmeter shaft 23 will close its set of contacts to establish a circuit from wire 24, across contacts of this cam and thence across sequence selector switch LF in position 4 (corresponding to unit 4) and thence to time delay relay 25d and to the other side of the A. C. supply. Upon expiration of the time interval for which this relay is set its contacts close to again actuate the unlatching coil of latching relay 27d in the manner described for the other units 2 and 3. Similarly the motor operated load limit mechanism including a motor 32d will be operated in the opening direction to cause the energization of the relays 37d, 38d and 14d whereupon the load controller Ld is placed in operation to transmit load control impulses to the load adjusting motor relays 16d. The circuits for these operations are similar to the circuits for units 2 and 3. The station load will be automatically and economically distributed between all of the units inasmuch as the galvanometer bridge circuit for load controller Ld is now bridged against the resistances 35a—35d. Here again if the frequency varies, pilot unit No. 1 will be the only one to receive frequency corrective impulses while the remaining units will follow up to redistribute the load.

Additional units may be transferred if desired merely by providing additional circuits and relays similar to those for the other units and adding another set of cams to the totalizing wattmeter 19. It will of course be understood that these cams are angularly related to each other in any manner in which it may be desired to bring the units on at the points for maximum efficiency and any additional cams would be likewise suitably angularly related as to obtain this desired efficiency.

Transfer of unit No. 4 from load back to condenser.—When the system demand drops to such a point that three units can more economically carry the load and also maintain normal frequency, unit No. 4 which was "last on" will now be "first off", i. e., transferred from load to condenser. This is accomplished in that as the station output decreases the totalizing wattmeter 19 will cause its shaft 23 to be partially reversely rotated thereby causing a group of condenser transfer cams 23c to function. For instance, with the station load decreased to the point of economical transfer the last or extreme right cam of transfer cams 23c will cause its contact to close whereupon a circuit is established from A. C. supply wire 24, thence up and over to sequence selector switch LF in position 4 (unit No. 4), to a time delay relay 50d and the other side of the A. C. supply (heavy line immediately below the relay). Assuming that the decrease in station output is permanent and not just temporary the time delay relay will close its contact upon expiration of a sufficient period of time which determines whether the fluctuation is permanent or temporary, whereupon a circuit is then established from the D. C. supply 26, across relay contacts and thence directly to the vertical or latching coil of the latching relay 27d and to the other side of the D. C. supply. Upon energization of the latching coil its contact bar is raised and mechanically latched so as to maintain closed the upper group of contacts. The motor 32d of the load limit mechanism is then operated to close the turbine gates, this being effected by a circuit extending from one side of the D. C. supply (upper right corner Fig. 1) as from upper right contact of D. C. switch 29d through the manually adjustable resistance adjacent the motor 32d, thence through the motor and the right or closing field thereof, coil of relay 61d, thence up and across the upper right pair of contacts of latching relay 27d, down to and across snap switch 33d, thence over and up to the other side of the D. C. supply, namely lower right contact of switch 29d. During closing operation of motor 32d the load limit cam is rotated in a clockwise direction (having been previously rotated counter-clockwise when unit 4 was transferred to load), thereby reclosing snap switch 30d and opening snap switch 33d which opens the circuit for the load limit motor. Rotation of this load limit cam acts preferably directly on the pilot valve linkage of the speed governor such as described in my co-pending application filed herewith thereby causing the gate operating servo-motor to close the turbine gates.

Closure of snap switch 30d closes a circuit for relays 37d, 38d and 14d which are thus energized and opened thereby breaking various circuits for unit No. 4, such as the galvanometer, the motor for 51d which operates the contact-making device 15d, the common wire for said contact-making device, and special contacts associated with the contact-making device but which are in operation only when unit No. 4 is selected as the pilot unit. The circuit for the relays 37d, etc. extends (upper right corner Fig. 1) from the upper right contact of switch 29d to the right and thence down through resistance adjacent motor 32d and along wire 52d and over to one side of the coils of relays 14d, etc. and back along the other wire 53d, across the closed snap switch 30d and thence to the left and up to the lower right contact of switch 29d of the D. C. supply.

With unit 4 now on condenser the station load is redistributed between the other three units in the manner as previously described and involving the unit wattmeter operated resistances 35a, 35b and 35c.

*Transfer of unit No. 3 from load back to condenser.*—In case the system demand decreases still further so that the station load can be more economically carried by two units instead of three, the unit No. 3 is transferred back to condenser when the station load reaches a predetermined station value, this being effected by the next to the last cam on the totalizing wattmeter shaft 23, which closes a circuit from A. C. supply line 24 through sequence selector switch SS₀ in position 3 (unit No. 3) to energize time delay relay 50c. The motor 32c of the motor operated load limit mechanism and the relays 37c, 38c and 14c are all actuated as just described for unit 4 and hence a further description of the circuits for unit 3 is not necessary. With unit 3 transferred back to condenser or being "second off", the station output will now be redistributed between units 1 and 2.

If the station load decreases still further so it is more economical for unit 1 to carry the load alone then the third from the last cam on totalizing wattmeter shaft 23 will close its contact and establish a circuit from the A. C. supply 24 through selector switch FL₃ in position 2 (unit 2) to energize time delay relay 50b whereupon the various motor actuated operations and energization of relays 37b, etc. are effected to transfer unit 2 to condenser in the manner as described for units 3 and 4. It is thus seen that unit 2 is the "first on" and "last off".

Selected pilot unit 1 always remains on load providing that the pilot switch is set in position 1 thereby causing this unit to maintain normal frequency independently of the unit output or load demand. Any other unit, as previously mentioned, may be selected as the pilot unit merely by changing the position of pilot switch P. If for instance unit 2 is selected as the pilot unit then the sequence selector switches must be repositioned in order to readjust the sequence in which the units shall come on and go off. With unit No. 2 selected as the pilot unit, sequence selector switch FL could be changed to position 1 (the second contact from the left of each group) thereby causing unit 1 to be the "first on" and "last off". Any other unit might similarly be selected as the pilot unit in which case the other sequence selector switches SS and LF would be readjusted. In any case it is seen that the totalizing wattmeter shaft 23 will function to cause the proper sequence of transfer operation because of the circuits from the respective cams being adapted to be connected through the sequence selector switches to the instruments of any unit.

*Air vent valve control.*—When the prime movers are of the hydraulic turbine type it is desirable to vent their respective draft tubes when the units are on condenser thereby unwatering the turbine runner to allow it to rotate freely in air with minimum resistance and consequently with minimum condenser load on the line. However upon transfer of the unit back to load the vent must be closed and in order to effect the opening and closing thereof an improved automatic control arrangement is provided in cooperation with the other automatic functions. This control includes a draft tube vent valve mechanism diagrammatically indicated at 55a—55d, each of which is actuated by a motor 56a—56d. To open and close the valve without overrunning its desired position the following circuits and contacts are provided. Assuming unit 2 to be on condenser then its vent valve is opened but when the unit is transferred to load the horizontal or unlatching coil of relay 27b releases its contact bar to establish a circuit which energizes amongst other things a relay 31b which thereupon closes to establish a motor circuit for operating the valve, this circuit being from wire 57b to the motor 56b through an arm 58b which is connected to the valve so as to rotate therewith. The circuit then continues from motor 56b up through the resistance adjacent motor 32b and to the supply switch 29b. Upon actuation of motor 56b it is first supplied with current from wire 57b until rotatable arm 58b moves off the contact, to which wire 57b is connected, and bridges the gap from wire 57b to a segmental contact energized by current through wire 59b from switch 29b. As the arm contacts with the segment the motor current is supplied therefrom so that the motor continues uninterruptedly in moving the arm around to the other end of the segment where it moves off the segment and disconnects the motor circuit, the arm coming to rest upon an insulated contact connected to a wire 60b. Such a position is shown for valve control 55a. When the unit is transferred from load back to condenser the vertical or latching coil of relay 27b or the corresponding relays of the other units is energized to raise its contact bar and thereby energize a relay 61b to establish a circuit through wire 60b, arm 58b thence to the motor 56b and back to the other side of the line as previously described. Upon initial opening movement of the valve the contact arm bridges the small gap between the contact for wire 60b and the other segmental contact and finally slides off of the segment to the other contact for wire 57b thereby breaking the circuit for the motor to stop the same and hold the valve in open position to vent the draft tube. Both segments are energized from the wire 59b.

*Type 2 operation: station base load with transfer of units from condenser to load or vice versa automatically in accordance with manual adjustments of a master load setter so as to give maximum combined efficiency for any given station base load determined by master load setter.*

If two or more plants are interconnected in a common system and for certain load demands it is desirable to allow one plant exclusively to control frequency while the other plants operate on a fixed output or base load, then the operator at the plant operating on base load will adjust the station output in accordance with a predetermined schedule of operation. This schedule may change during different periods of the day or it may be dictated by a load dispatcher at some distant point who supervises the load distribution between various plants of a single system or interconnected systems. This type 2 operation is arranged to meet such a situation by the provision of a master load setter which in combination with the load controllers and other instruments will maintain a fixed station output and if the station base load is changed in accordance with the schedule then if it is more economical to carry the new load by adding or taking off a unit this will be done automatically by the totalizing wattmeter transfer mechanism. The general operation is somewhat similar to the automatic frequency transfer except that the frequency controller is now disconnected and the master load setter substituted therefor.

In this type of operation type selector switch S is in position 2 (second contact from bottom of each group a—f). Pilot switch P is in off position (the left contact of each group a—g). Sequence selector switches LF, etc. are in any position in which it is desired the units shall "come on" or "go off", as previously described in connection with frequency transfer and which for sake of illustration FL will be considered to be in position 2, unit 1 remaining at all times on load the same as with frequency control on transfer. Sequence selector switch SA will be in position 3 and LF in position 4, thereby insuring that units 2, 3 and 4 will come on the line in the order named and go off in the reverse order. Sub-type selector switches S₁, etc. are each in position 1 (transfer position).

With the various switches set as above described the frequency controller 10 is disconnected as it will be noted that no wires lead from the second contacts in type selector switch $S_c$, $S_e$, $S_t$ although the adjacent contacts are connected to the frequency controller. However, a master load setter 60 in the form of a manually adjustable rotatable resistance is connected by its slide wire leading from the top thereof down to type selector switch $S_d$ in position 2 and thence over to wire 40 (Fig. 1a) and wires 61a, etc. to the galvanometer circuits of each of the load controllers La, etc. respectively, it being noted that in each case completion of the galvanometer circuit requires closure of relays 37a, etc. from which the circuit is connected across their respective sub-type selector switches $S_{1g}$, etc. in position 1, thence through the galvanometer and back to the sliding contact of their respective unit wattmeter operated resistances 35a, etc. Thus as previously described the galvanometer circuits are commonly connected to the resistances 35a, etc. which are all balanced against the master load setter 60. As also pointed out in connection with the transfer operations of the station frequency control the relays 37b, 38b and 14b and corresponding relays for the other units are energized and the load controller galvanometer circuits for the respective units are cut out as long as these units are on condenser. However, if the master load setter 60 is manually adjusted by the operator for a station output in excess of that which can be economically carried by unit No. 1 then as unit No. 1 increases its output in attempting to satisfy the new demand, a point will be finally reached where the totalizing wattmeter 19 will have rotated its shaft 23 to close the contact of cam 23a to establish a circuit through wire 23b and thence through the sequence selector switch FL to transfer unit No. 2 from condenser to load in the identical manner as was accomplished with the frequency transfer operation. The station output will thereupon be redistributed between units 1 and 2 but with their combined output determined by the master load setter. If later on the operator again adjusts the master load setter for a greater station output then units 1 and 2 will be adjusted to increase their output until the totalizing wattmeter shaft 23 will again reach a point of angular displacement so as to close the second cam contact and thereupon transfer the third unit from condenser to load in the same manner as described with the frequency transfer. The load will thereupon again be redistributed among the three units. In a similar manner the fourth unit is brought on. In case the station output is decreased by the master load setter the units will be successively transferred back to condenser in the same manner as with the frequency transfer.

*Type 3 operation: station frequency control, non-transfer*

In this operation a fixed number of units are placed on load with load distribution between them and one of the units acts as a frequency pilot unit. However, additional units are not transferred automatically from condenser to load or vice versa. The plant simply operates with a fixed number of units and their combined output is varied solely in accordance with the function of maintaining standard frequency.

The type selector switch S is in position 3 in which case it is seen that switches $S_c$, $S_e$ and $S_f$ are connected to render the frequency controller operative while the master load setter 60, by virtue of switch $S_d$ being in position 3, is disconnected. All of the sequence selector switches FL, etc. are in off position because in this operation the units which are operating are never transferred automatically. By having the sequence selector switches in their off position it is seen that the cam operated contacts of the totalizing wattmeter 19 are rendered ineffective. If each of the four units is on load then each of the sub-type selector switches S₁, etc. is in position 2 while if it is desired not to employ some particular unit its sub-type selector switch will be placed in off position, thereby disconnecting its load controller. The pilot selector switch P is placed in a position so as to select some one unit to serve as the pilot unit, whereby this unit receives frequency control impulses after which the other units follow up to redistribute the load. Upon any variations in frequency from normal, frequency controller 10 will transmit frequency corrective impulses to the selected pilot unit, for example, unit 1, thereby varying its output in order to maintain normal frequency and upon doing this a potential difference will exist between the slide contact of the unit wattmeter operated resistances 35a, etc., thereby causing the load controllers of the other units to adjust their respective units and accordingly redistribute the load between the units in operation. The circuits for such a type of operation have been previously described in connection with the automatic frequency transfer operation. It is thus seen that the only difference between this type 3 operation and type 1 operation is that the sequence selector switches are in the off position which does not allow a circuit to be made from the totalizing wattmeter cams through the sequence selector switches to the time delay transfer relays 25a, 50a, etc. of the units which under normal automatic transfer operations actuate the motor operated load limits that would normally transfer a unit from load to condenser or vice versa. In the present type of operation the motor operated load limit will either be in the closed or open position with no provision for changing it from one to the other except by manual adjustment. Hence if one unit should be maintained on condenser operation and should it be desired to place this unit on load it will be necessary for the operator to manually actuate the load limit cam so as to throw the snap switches such as 30b and 33b and thus permit the governor pilot valve to cause opening of the prime mover. Instead of manually operating the load limit cam the operator could manually unlatch the latching relay such as 27b. If it is desired to manually transfer one of the units from load to condenser the operator would manually relatch the latching relay such as 27b or he could manually rotate the load limit cam to raise the pilot valve and cause the unit to shut down. In either case however the station load would be automatically redistributed between the remaining units.

*Type 4 operation: station base load, no transfer*

In this type of operation a fixed number of units are maintained on load the same as with the type 3 operation just considered, except that the load here is fixed (base load) whereas in type 3 operation the output is automatically variable to take care of frequency variations. Type selector switch S is in position 4 thereby disconnecting the frequency controller 10 and connecting the master load setter 60 as through switch S4 in position 4. The sequence selector switches FL, etc. are in their off position. The pilot switch P is also moved to its off position while the sub-type selector switches S1, etc. are in position 2. This operation will then be the same as type 2 which was station base load with automatic transfer except that the contact-making cams of the totalizing wattmeter 19 are rendered inoperative due to the sequence selector switches being in their off position. The master load setter 60 when set for a given station output will be bridged against the galvanometer circuits of each of the units on load and hence the load will be equally distributed between these units. The circuits for effecting this are the same as previously described with the other operations. If desired any unit may be manually transferred from load to condenser or vice versa by manually tripping the latching relays or by manually operating the load limit cam in which case the sub-type switch of that particular unit is placed in off position.

*Type 5 operation: independent unit base load with units connected in parallel*

In this operation the output of each unit is fixed and maintained fixed independently of the output of the other units. This type of operation is desirable under various conditions that might arise in normal operation of the plant or of a system.

Type selector switch S may be placed in any position although preferably it is in position 4 so as to cut out the frequency controller. While the master load setter 60 will connect with this particular position nevertheless it will be disconnected from the galvanometer circuits of the load controllers La, etc. due to sub-type selector switches S1 being in position 4. The pilot switch P is in off position. With the sub-type selector switches S1, etc. in position 4 the galvanometer circuit for each unit now extends from the slide contact of the unit wattmeter resistance 35a down through the galvanometer and thence back through switch S1g in position 4 and up to the slide contact of the manually adjustable unit load setter 70a. A similar circuit is established for the other units which happen to be on load. It is thus seen that the output of each individual unit may be adjusted by its own unit load setter and this output will be maintained irrespective of frequency variations or the output of the units.

*Protective circuit and miscellaneous*

An auto-transformer 71 (upper right corner Fig. 1a) supplies current to the galvanometer fields of the load controllers La, etc.

A protective circuit included in this improved arrangement is similar to that described in my co-pending application Serial No. 561,460 filed herewith and hence a detailed description is not necessary except to point out that the circuit is initially established by momentarily closing a switch 73' whereby relays 73 and 74 are closed and thereafter held closed by the establishment of the protective circuit which comes from one side of the D. C. line 72 (lower left corner Fig. 1), thence through the coils of protective relays 73 and 74 connected in parallel and back across the upper left pair of contacts of relay 73 to a normally closed push button switch 73", thence to sub-type switches S1a, S2a, etc. in any position and back to a relay 75, Fig. 1, to the high and low limit switches respectively generally indicated at 75', down wire 76' to the contacts of a frequency recorder 76 and through type selector switch Sa in any of its various positions from which it goes out along either of two circuits one of which goes through pilot selector switch Pd in any position 1—4 and thence back to the other side of the D. C. line while the other circuit goes through Pd in off position and back to the other side. The reason for these two circuits is that when the type operation switch S is in position 1 or 3, which is station frequency on transfer and station non-transfer, the pilot switch section d cannot be in off position but must be in any one of positions 1—4 in order to complete the circuit. When the type operation switch S is in positions 2 or 4, which correspond respectively to station base load on transfer and station base load non-transfer, the pilot switch Pd must be in the off position in order to maintain the circuit. Relay 75 is energized thus opening the protective circuit when any of the sequence selector switches FL, etc. or the pilot switch P are in the same position except off. For instance it will be noted that switches FLa, FLc, and SSa, SSb, SSc, and LFb are supplied from one side of the D. C. supply while the switches FLb, LFa, LFc, and Pa, Pb and Pc are commonly connected to one side of the coil of relay 75, the other side of which is connected to the other side of the D. C. supply. It is thus seen that if it is desired to energize and open relay 75 and thus open the protective circuit as when any of the pilot or sequence selector switches are in their improper positions, it is only necessary to have the contacts of the various sections such as FLa connected to other contacts such as those in LFa because with the position 1 contacts thus connected then when switches FL and LF are both in position 1 a circuit is established from one side of the D. C. supply through the protective circuit relay 75 and to the other side of the D. C., thus opening the protective circuit. Similar interconnections may be established between the various contacts of the other sections of these switches in such a manner that the sequence selector switches and the pilot switch must always be in their proper relative positions in order to permit the automatic equipment to function. The wires for all of the various interconnections between these contacts have not been shown in order to maintain simplicity and clarity of the drawings. From the description of one connection and the principle thereof the remaining connections can be made. It will of course be understood that the unit resistances such as 70a, 20a, 35a, etc. are supplied through individual transformers commonly connected across the A. C. lines.

Special contacts for transmitting frequency control impulses are provided on the contact-making device of each load controller so that with the load controllers mechanically connected together frequency control impulses may be transmitted to the pilot unit in absolute alternation with the load control impulses which are transmitted to the other or follow up units. In this way a greater degree of stable operation is obtained due to the pilot unit being momentarily adjusted for frequency without any adjustment of the other units and then the other units have their load redistributed while the pilot unit is free of adjustment. The mechanical interconnection of these load controllers has been shown more in detail in a modification of my application, Serial No. 525,355 and it will of course be understood that the cams for the special contacts are suitably angularly related to the cams of the regular contact-making devices.

*Transfer to load of all units on condenser automatically upon predetermined low frequency.*—Upon occurrence of a predetermined low frequency, a switch 76" (left side Fig. 1) is closed by the frequency recorder 76 thereby establishing a circuit from one side of the D. C. supply through wire 176, switch 76" and wire 177 to each of the relays 178a, 178b, etc. Upon energization and closure of these relays, circuits are established across their contacts to one of the contacts of each time delay relay 25a, etc. and from there to the unlatching coil of relays 27a, etc. The units which are on condenser are thus transferred to load.

*Manual transfer.*—As described in my co-pending application, Serial No. 525,355, each unit may be individually manually transferred from load to condenser or vice versa irrespective of whether or not the automatic control is connected and functioning. The manual operation is effected by operating normally neutral switches 179a, 179b, etc. depending upon which units or units it is desired to transfer. By pushing any one or all of these switches to up position a circuit is established for their respective unit to energize the vertical or latching coil of relay 27a, etc. while pulling down on the switches causes energization of the horizontal or unlatching relay coils. The unit or units are thereupon transferred in accordance with the previous description herein.

Instead of operating a unit or units as condensers for purposes of power factor correction or for carrying a portion of the wattless current, the unit can be kept in parallel with the system with varying amounts of excitation so that little or no condenser effect is present, thus causing the machine to be merely held in reserve for generating service. It will also of course be understood that reference to transferring a unit or units in accordance with the total load is merely for purposes of broadly defining various means and methods whereby the units are transferred either in accordance with an actual total load or are transferred or controlled in accordance with some function of the total load or some function, the relation of which to the total load is well-established. Such functional means can take the form of suitable devices for obtaining the summation of the opening of gates 200 of the various units such as hydraulic turbines diagrammatically indicated at $T_1$ and $T_2$, Figs. 2 and 3. For example, devices giving a potential in proportion to the gate openings or the flow, these devices 20a', 20b', etc. being similar to series resistances 20a, 20b, 20c, etc. but instead of being actuated by the unit wattmeters they would be suitably mechanically connected to and actuated by the gates of their respective units through links and levers 201 whereby the accumulated potentials can operate a suitable instrument similar to the totalizing potentiometer 19. A mechanical equivalent of this arrangement can include a remote position indicator connected to the gate opening mechanism of each unit, a suitable indicator being a Selsyn 202 or equivalent type of apparatus, the receiving end 203 of which would operate a cam 204, there being a receiving apparatus and cam for each unit. These cams can actuate a suitable lever mechanism 205 so as to give the summation of the gate opening of the individual units, it being noted that the lower lever has a fixed fulcrum 206 while the succeeding levers have movable fulcrums 207 to effect said summation. The lever mechanism would in turn operate the contact devices 208 for the transfer or control means.

It will of course be understood that various changes may be made from the one specific embodiment of the invention as illustrated and described without departing from the spirit of the invention as set forth in the appended claims.

I claim:

1. A control system for a plurality of prime mover operated electrical generating units connected in parallel for condenser or load operation, comprising, in combination, means for totalizing the output of all units on load, and means for transferring a unit from condenser operation to load automatically when said totalizing means indicates a predetermined load value.

2. A control system for a plurality of prime mover operated electrical generating units connected in parallel and adapted for reserve or load operation, comprising, in combination, means for totalizing the output of all units on load, and means for transferring a unit from reserve to load automatically when said totalizing means indicates a predetermined load value at which it is more economic to operate with an additional unit than to continue to increase the output of the unit or units already on load.

3. A control system for a plurality of prime mover operated electrical generating units connected in parallel for condenser or load operation, comprising, in combination, means for totalizing the output of all units on load, and means for transferring a unit from load to condenser operation automatically when said totalizing means indicates a predetermined load value.

4. A control system for a plurality of prime mover operated electrical generating units connected in parallel for condenser or load operation, comprising, in combination, means for totalizing the output of all units on load, means for transferring a unit from condenser operation to load automatically when said totalizing means indicates a predetermined load value, and means for maintaining economic load distribution between all units on load automatically in accordance with a predetermined schedule of operation based on the operating characteristics of the individual units.

5. A control system for a plurality of prime mover operated electrical generating units connected in parallel for condenser or load operation, comprising, in combination, means for totalizing the output of all units on load, means for transferring a unit from condenser operation to load or vice versa automatically when said totalizing means indicates a predetermined load value, and means for effecting economic redistribution of load between all units on load automatically whenever a unit is transferred.

6. A control system for a plurality of prime mover operated electrical generating units connected in parallel for condenser or load operation, comprising, in combination, means for totalizing the output of all units on load, means for effecting frequency control by at least one of said units, said frequency unit or units remaining on load at all times irrespective of the total output, means for successively transferring the remaining units from condenser to load automatically in accordance with predetermined successive increases in the totalized output, and means for selecting the sequence in which two or more condenser units are transferred to load.

7. A control system for a plurality of prime mover operated electrical generating units connected in parallel for condenser or load operation, comprising, in combination, means for totalizing the output of all units on load, means for effecting frequency control by at least one of said units, said frequency unit or units remaining on load at all times irrespective of the total output, means for successively transferring the remaining units from condenser to load automatically in accordance with predetermined successive increases in the totalized output, and means including manually operable selector switch mechanism for selecting the sequence in which two or more condenser units are transferred to load.

8. A control system for a plurality of prime mover operated electrical generating units connected in parallel for condenser or load operation, comprising, in combination, means for totalizing the output of all units on load, means for effecting frequency control by at least one of said units, said frequency unit or units remaining on load at all times irrespective of the total output, means for successively transferring the remaining units from condenser to load or vice versa automatically in accordance with predetermined successive changes in the totalized output, and means for selecting the sequence in which two or more condenser units are transferred to load and for causing the units to be transferred from load to condenser in the reverse order of the selected sequence.

9. A control system for a plurality of prime mover operated electrical generating units connected in parallel for condenser or load operation, comprising, in combination, means for totalizing the output of all units on load, means for effecting frequency control by at least one of said units, said frequency unit or units remaining on load at all times irrespective of the total output, means for successively transferring the remaining units from condenser to load automatically in accordance with predetermined successive increases in the totalized output, and means for selecting the sequence in which two or more units on load are transferred to condenser.

10. A control system for three or more prime mover operated electrical generating units connected in parallel for condenser or load operation, comprising, in combination, means whereby one of said units operates as a frequency pilot unit, means for successively transferring the remaining units from condenser to load automatically upon predetermined changes in load demand, and means for selecting the order in which the units are transferred to load.

11. A control system for three or more prime mover operated electrical generating units connected in parallel for condenser or load operation, comprising, in combination, means whereby one of said units is adapted to operate as a frequency pilot unit, means whereby any one of said units may be selected as the pilot unit, means for successively transferring the remaining units from condenser to load automatically upon predetermined changes in load demand, and means for selecting the order in which the units are transferred to load.

12. A control system for a plurality of prime mover operated electrical generating units connected in parallel for condenser or load operation, comprising, in combination, means for totalizing the output of all units on load, a frequency controller adapted to transmit electrical control impulses automatically in accordance with variations in frequency from normal, means whereby one of said units acts as a frequency pilot unit and receives said frequency control impulses so as to adjust its output to thereby maintain normal frequency, means whereby the remaining units are successively transferred to load from condenser operation automatically when the totalized load reaches certain predetermined successive values, load controller mechanism, means whereby the same is responsive when the load distribution between units or load varies from a predetermined relation, and means for transmitting load control impulses to all units on load except the pilot unit.

13. A control system for a plurality of prime mover operated electrical generating units connected in parallel for condenser or load operation comprising, in combination, means for totalizing the output of all units on load, means controlled by said totalizing means for transferring a unit from condenser to load automatically in accordance with a predetermined increase in the totalized load, and means for transferring said unit back to condenser at a total load value different from that at which the unit was transferred to load.

14. A control system for a plurality of prime mover operated electrical generating units connected in parallel for condenser or load operation, comprising, in combination, condenser and load cams, means for actuating said cams in accordance with the total output of all units on load, and means controlled by said cams for effecting transfer of a unit from load to condenser or vice versa.

15. The combination set forth in claim 14 further characterized in that said cams are reversely actuated, the load cam being operable in one direction of rotation and the condenser cam in the other.

16. A control system for a plurality of prime mover operated electrical generating units connected in parallel for condenser or load operation, comprising, in combination, condenser and load cams, means for actuating said cams in accordance with the total output of all units on load, and means controlled by said cams for effecting transfer of a unit from load to condenser or vice versa including a time delay relay adapted to permit a transfer operation only after its initiating cause has existed for a given time interval.

17. A control system for a plurality of prime mover operated electrical generating units connected in parallel for condenser or load operation, comprising, in combination, means for totalizing the output of all units on load, means for transferring a unit from condenser operation to load automatically when said totalizing means indicates a predetermined load value including time delay relay mechanism adapted to permit a transfer operation only after its initiating cause has existed for a given time interval, frequency controlling mechanism, and means for transferring all units from condenser to load for frequency control automatically upon a predetermined drop in frequency from normal.

18. A control system for a plurality of prime mover operated electrical generating units connected in parallel and adapted for different conditions of operation, comprising, in combination, means for totalizing the output of all units on load, manually adjustable master load setter mechanism for determining station base load, and means controlled thereby and operable in conjunction with said totalizing mechanism whereby units are transferred from one condition of operation to the other automatically in accordance with a change in base load as adjusted by said master load setter mechanism.

19. A control system for a plurality of prime mover operated electrical generating units connected in parallel and adapted for different conditions of operation, comprising, in combination, means for totalizing the output of all units on load, frequency controlling mechanism, selector switch mechanism adapted to connect a unit with said frequency control, manually adjustable master load setter mechanism for determining station base load, and means controlled by said master load setter mechanism and operable in conjunction with said totalizing mechanism whereby units are transferred from one condition of operation to the other automatically in accordance with a change in base load as adjusted by said master load setter mechanism, said selector switch mechanism having provision for rendering said latter means operative upon shifting of the switch mechanism to a given position and for rendering said frequency control inoperative.

20. A control system for a plurality of prime mover operated electrical generating units connected in parallel comprising, in combination, means for totalizing the output of all units on load, means for transferring a unit from one mode of operation to another mode of operation automatically when said totalizing means indicates a predetermined load value, means whereby a unit functions as a frequency pilot unit with the remaining units automatically transferred in accordance with changes in total load in maintaining normal frequency, and means for rendering the transfer mechanism inoperative and causing a fixed number of units on load to alone take care of all load changes in maintaining normal frequency.

21. A control system for a plurality of prime mover operated electrical generating units connected in parallel comprising, in combination, means for totalizing the output of all units on load, means for transferring a unit from one mode of operation to another mode of operation automatically when said totalizing means indicates a predetermined load value, means whereby a unit functions as a frequency pilot unit with the remaining units automatically transferred in accordance with changes in total load in maintaining normal frequency, and means for rendering the totalizing mechanism inoperative and causing a fixed number of units on load to alone take care of all load changes in maintaining normal frequency.

22. A control system for a plurality of prime mover operated electrical generating units connected in parallel comprising, in combination, means for totalizing the output of all units on load, means for transferring a unit from one mode of operation to another mode of operation automatically when said totalizing means indicates a predetermined load value, means whereby station base load may be maintained, and means whereby station frequency control may be effected by a fixed number of units.

23. A control system for three or more prime mover operated electrical generating units connected in parallel and adapted for different modes of operation including load, comprising, in combination, means whereby one of said units operates on load, means for successively transferring the remaining units from their then existing mode of operation to load automatically upon predetermined changes in load demand, and means for selecting the order in which the units are transferred to load.

24. A control system for a plurality of prime mover operated electrical generating units connected in parallel and adapted to be on or off load, comprising, in combination, means for totalizing the load of all units, means for varying the number of units on load automatically in accordance with the totalized load, and means for establishing independent unit base load and for rendering said automatic means inoperative.

25. A control system for a plurality of prime mover operated electrical generating units connected in parallel and adapted to be on or off load, comprising, in combination, means for totalizing the load of all units, means for varying the number of units on load automatically in accordance with the totalized load, and the unit load values determined in accordance with a predetermined schedule of economic load distribution, and means for manually varying the number of units on load while said automatic means remains operative.

26. A control system for a plurality of prime mover operated electrical generating units connected in parallel comprising, in combination, means for totalizing the load of all units, means for adjusting the output per unit automatically in accordance with the demand, and means for additionally adjusting the output per unit automatically in accordance with predetermined changes in the totalized load as determined by said totalizing means.

27. A control system for a plurality of prime mover operated electrical generating units connected in parallel comprising, in combination, means for totalizing the load of all units, speed responsive governors one for each unit adapted to adjust the output of their respective units automatically in accordance with changes in load demand, and means controlled by said totalizing means for varying the number of units in operation automatically in accordance with predetermined changes in the totalized load whereby when the number of units on load is thus varied the output per unit is changed while maintaining substantially constant total output.

28. A control system for a plurality of prime mover operated electrical generating units connected in parallel for condenser or load operation, comprising, in combination, means for totalizing the output of a plurality of units on load, and means for transferring one of said plurality of units from condenser operation to load automatically when said totalizing means indicates a predetermined load value.

29. A control system for a plurality of prime mover operated electrical generating units connected in parallel comprising, in combination, means for totalizing the output of a plurality of units on load, and means for transferring a unit from load to reserve automatically when said totalizing means indicates a predetermined load value at which it is more economic to operate with fewer units than to continue to decrease the output of each of the units already on load.

30. A control system for a plurality of prime mover operated electrical generating units connected in parallel and adapted for different modes of operation and other units also connected in parallel therewith but outside of the control of said control system whereby all of the units are adapted to supply a system load comprising, in combination, means for totalizing the output of all of said units that may be on load, and means whereby a unit within said control system may be transferred from one mode of operation to another automatically when said totalizing means indicates a predetermined system load value.

S. LOGAN KERR.